United States Patent Office 2,846,376
Patented Aug. 5, 1958

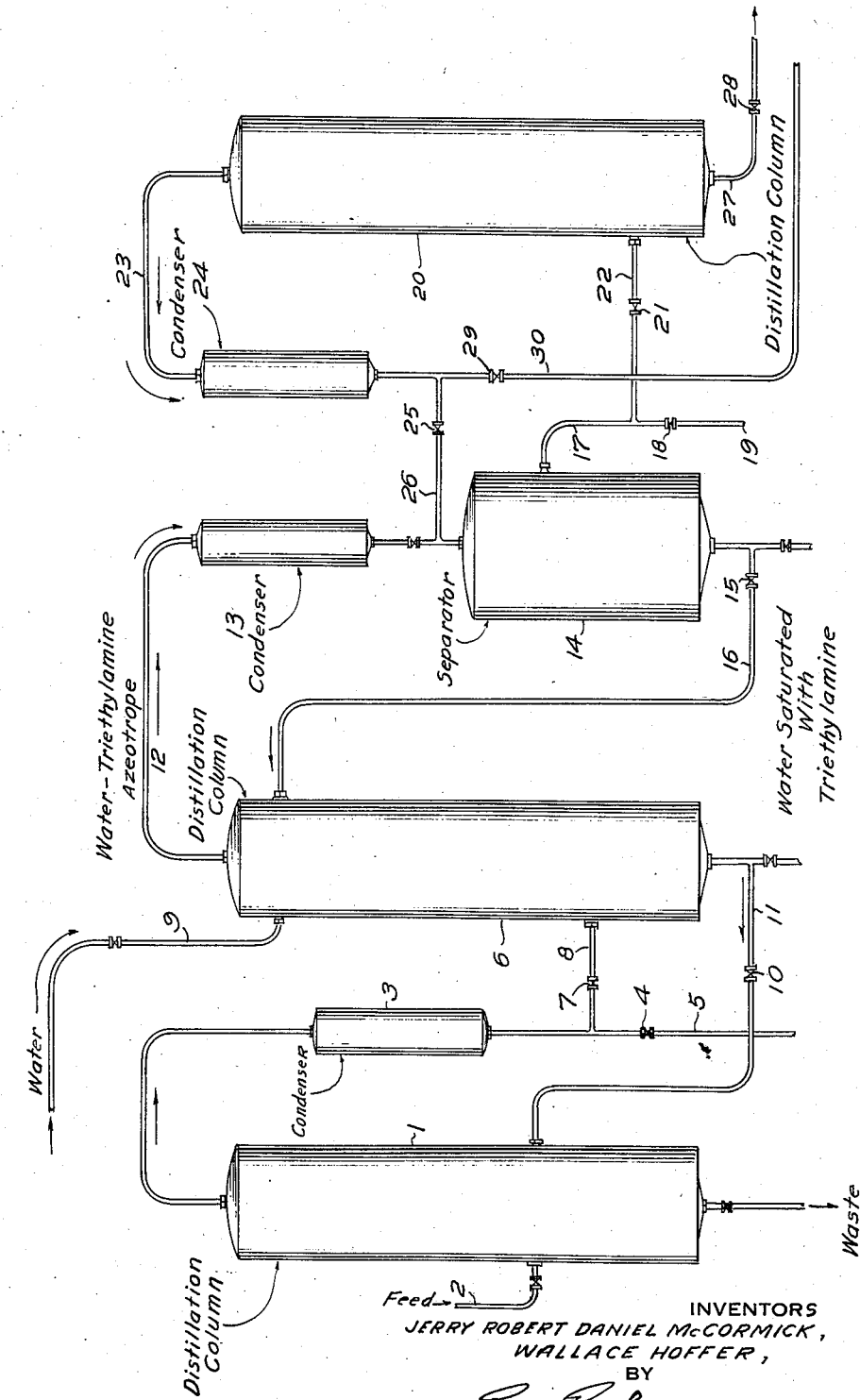

2,846,376

PURIFICATION OF TRIETHYLAMINE

Jerry Robert Daniel McCormick, New City, and Wallace Hoffer, Orangeburg, N. Y., assignors to American Cyanamid Company, New York, N. Y., a corporation of Maine Application May 22, 1953, Serial No. 356,854

1 Claim. (Cl. 202—42)

This invention relates to a method of recovering triethylamine from complex organic mixtures and more particularly to the recovery of triethylamine from such mixtures by extractive distillation.

The new method of this invention comprises extractively distilling a mixture comprising triethylamine, a lower aliphatic alcohol solvent and water, employing as an extractant a counter-current flow of water in a quantity equal to from about one to ten times the weight of distillate, and collecting as distillate a fraction which is largely a binary azeotrope of water and triethylamine.

That triethylamine can be separated from mixtures, such as described above, by extractive distillation with water in surprising in view of the fact that triethylamine forms ternary or higher azeotropic mixtures with water and the aliphatic hydroxy solvents. It is believed that this is one of the very few, if not the only instance where a ternary or higher azeotrope has been extractively distilled against a component of the azeotropic mixture and a binary azeotrope obtained as the distillate. That a ternary azeotrope of water, triethylamine and a lower aliphatic alcohol can be separated in such a manner is indeed surprising in view of the fact that such azeotropes are water miscible and the process cannot be considered as a simple scrubbing operation. The success of the new process is also surprising in view of the fact that the hydroxy solvent of solvents are removed by a water extractive distillation process and some of the hydroxy solvents, for instance n-butanol, are only slightly soluble in water.

Mixtures which can suitably be treated according to the new process of this invention include aqueous mixtures of triethylamine with butanol, 2-ethoxyethanol, isopropanol, n-propanol, ethanol, isobutanol or tertiary butanol. The mixture can contain a combination of hydroxy solvents, as illustrated by one containing both 2-ethoxyethanol and n-butanol, as well as various other materials as illustrated by high boiling organic compounds, inorganic salts and volatile materials. The mixture can comprise a ternary or higher azeotrope or it can comprise materials in other than azeotropic proportions.

Mixtures suitable for use in the new process of this invention are encountered in several different fields of organic chemistry. For instance a complex organic mixture containing triethylamine and suitable for use in the new process of this invention may be obtained as the result of antibiotic purification. In the purification of certain of the antibiotics it is customary to convert an acid addition salt of the antibiotic in butanol solution to a triethylamine salt. The triethylamine salt is then dissolved in 2-ethoxyethanol and a precipitate of an acid addition salt obtained by the addition of an acid. Such a process results in a mixture of water, triethylamine, butanol and 2-ethoxyethanol containing in addition small quantities of propanol, dimethylamine, and ammonium hydroxide, as well as various salts. Attempts to separate such a mixture by fractional distillation result in a constant boiling, water-miscible mixture containing approximately 60%–80% triethylamine. The recovery of reasonably pure triethylamine from such a mixture has in the past been considered impossible and, as far as is known, such mixtures have been found to be useful for no chemical purposes whatsoever. By the new process of this invention triethylamine of sufficient purity for reuse is readily obtained from such a complex mixture.

Other instances where mixtures suitable for use in the new process of this invention are encountered will be found in the manufacture of triethylamine. In practically all of the commercially satisfactory methods of manufacturing triethylamine, aqueous mixtures comprising triethylamine and a hydroxy solvent are obtained and the new method of this invention is far superior to the prior art methods for recovering triethylamine from such mixtures. The new method of this invention not only results in a pure product with a minimum of difficulty but eliminates such undesirable steps as drying with sodium hydroxide.

As will be seen, the new process of this invention has many advantages. Not only can it be employed to recover triethylamine from complex mixtures that are not operative in prior art procedures but it can be employed to more readily recover triethylamine from less complex mixtures. The new process is efficient, simple and employs equipment which is readily available.

As previously stated, the new process of this invention comprises subjecting a crude mixture to extractive distillation with an aqueous extractant and this results in a binary azeotropic mixture of water and triethylamine as an overhead fraction. On condensation, two layers are formed if the temperature of the condensate is maintained above the cloud point of triethylamine and water. The lower or aqueous layer can be separated and returned to the distillation apparatus since it is, of course, saturated with triethylamine. The organic layer, comprising triethylamine saturated with water, can be further distilled to remove the water as the triethylamine-water azeotrope, or it may be employed for chemical purposes without further treatment since the percentage of water is usually only about 5%.

If desired, the original aqueous mixture of the type described in previous paragraphs can be subjected to a preliminary fractional distillation to obtain a ternary or higher azeotropic mixture of triethylamine and this azeotrope employed in the new process of this invention. Such a preliminary distillation not only results in a purer product, but materially reduces the volume of material to be handled in the extractive distillation column.

The new process of this invention can be performed in any commercially available extractive distillation apparatus as illustrated by packed towers, baffle towers, and the like although the preferred apparatus comprises a plated column having from about fifty to eighty plates. Employing such apparatus it will usually be found convenient to introduce the aqueous extractant on from the fifth to fifteenth plate from the top of the tower. Apparatus suitable for extractive distillation, however, is well known to those skilled in the art and this invention is not primarily concerned with the type of apparatus employed.

If there is employed as a starting material in the extractive distillation a crude mixture of triethylamine that has not been subjected to a preliminary fractional distillation, and the mixture contains appreciable quantities of low boiling materials, it will sometimes be found to be advantageous to remove as overhead a first fraction to eliminate the low boiling constituents. The second fraction comprising the water azeotrope of triethylamine will then be collected as described above. On the other hand, if the crude mixture is free of low boiling constituents or if a preliminary fractional distillation is performed to obtain a relatively constant boiling fraction and this fraction is used in the extractive distillation, the first material to be obtained as overhead is the desired triethylamine-water azeotrope.

The quantity of water extractant to be introduced near the top of the distillation column can be varied within relatively wide limits. The lower limit is dependent upon the quantity of impurities originally present in the crude mixture, but it will usually be found that a quantity of water extractant equal to the weight of the distillate will give reasonably satisfactory results. The upper limit is determined only by the solubility of triethylamine in water, but as a general rule it will not be found to be advantageous to employ a quantity of water equal to more than about ten times the weight of distillate. A preferred quantity of water is from about two to six times the weight of distillate. The water is preferably introduced into the column at the temperature of the point of introduction or slightly lower. If the water extractant is introduced at a temperature much different from that of the column at the point of introduction, a decrease in efficiency will be experienced.

If the new process of this invention is operated under ideal conditions, most of the triethylamine can be recovered by simply collecting a fraction at an overhead temperature equal to the boiling point of the binary water-triethylamine azeotrope at the particular pressure at which one is operating. (The boiling point of water-triethylamine azeotrope at sea level pressure is about 75° C.) If the process is operated under less efficient conditions, it is usually advantageous to collect a fraction boiling over an appreciable temperature range, for example one, two or even five degrees on either side of the boiling point of the water-triethylamine azeotrope. Such a procedure is entirely satisfactory although it might require an additional fractionation of the organic phase of the distillate in order that a product of the desired purity be obtained. The pot temperature will vary considerably and may be from about 75° C. to about 90° C., depending upon the percentage of water and other materials present.

One embodiment of the invention is shown diagrammatically in the accompanying drawings. Referring to the accompanying drawings, a feed of crude material containing triethylamine is introduced into distillation column 1, through line 2. The overhead from distillation column 1 is condensed by means of condenser 3. Low boiling fractions are eliminated from the distillate by means of valve 4 and line 5, while the fractions containing a major portion of the triethylamine are introduced into the extractive distillation column 6 by means of valve 7 and line 8. The material in distillation column 6 is extensively distilled against a counter current flow of water introduced through line 9. Since the bottoms from distillation column 6 still contain some triethylamine, they can be added to the original feed in distillation column 1 by means of valve 10 and line 11. The overhead from distillation column 6, comprising a binary azeotrope of water and triethylamine, is conducted through line 12 to condenser 13 where it is condensed and collected in separator 14. Separator 14 is maintained at a temperature considerably above the cloud point of triethylamine and water (18° C.) so that two phases are obtained. The lower or aqueous phase, comprising water saturated with triethylamine, is, by means of valve 15 and conduit 16, returned to distillation column 6 and employed to supplement the water introduced through line 9. The upper phase from the separator comprising triethylamine saturated with water is removed by means of line 17. If wet triethylamine is desired, it can be obtained by means of valve 18 and line 19, or alternatively, the wet triethylamine can be fed into distillation column 20 by means of valve 21 and line 22. The water is removed from the wet triethylamine in distillation column 20 by azeotropic distillation whereby the water azeotrope of triethylamine is obtained as overhead and transferred by means of line 23 to condenser 24 where it is condensed and returned by means of valve 25 and line 26 to separator 14. Pure dry triethylamine can then be obtained as bottoms from distillation column 20 by means of line 27 and valve 28. Alternatively, after the water has been removed by azeotropic distillation in column 20, the pot temperature can be raised and pure triethylamine obtained as overhead, condensed by condenser 24 and collected by means of valve 29 and line 30. This results in an even further purification of the triethylamine product.

In the above-mentioned drawings, references to certain equipment such as pumps, gauges, and the like, which would obviously be necessary to operate the process, have been intentionally omitted and only sufficient equipment is illustrated to give a full understanding of the new process of this invention.

The new process will be further illustrated by the following specific example in which all parts are by weight unless otherwise indicated:

*Example*

Five hundred milliliters of crude triethylamine containing water, butanol, 2-ethoxyethanol and propanol as well as other impurities, assaying 75% triethylamine and having a cloud point of 21.5° C. was placed in a 3 liter flask equipped with a Stedman Column surmounted by a reflux head and an addition funnel. When distillation began, water was added through the top of the column. The ratio of water to distillate was approximately 3 to1. Three hundred forty-five milliliters of distillate were collected as a forerun. The average assay of this material was 93% triethylamine: the cloud point of a mixture of 3 milliliters of water and 5 milliliters of distillate was 19.5° C. The forerun contained 85% of the base present in the starting material. The tailrun consisted of 120 milliliters containing 4% of the total base. The material balance at this point was 89%. The residual liquor (1460 milliliters) was not assayed.

After several samples had been removed from the forerun, the volume was 244 milliliters. This volume of material was heated to 70° C. and the two phases which formed were separated. The water phase measured 13 milliliters and contained 1% of the base present in the forerun.

The amine phase was fractionated through the Stedman Column. The first fraction of 86 milliliters assayed 87% base and had a cloud point of 20.6° C. This fraction contained 33% of the base present in the forerun. The second fraction of 49 milliliters assayed 96% base and had a cloud point of 18.9° C. This fraction contained 21% of the base present at the start of this step. The final fraction of 54 milliliters assayed 100% base and had a cloud point of 18.8° C. This fraction contained 24% of the total base present at the start of this step. The residual liquor (column holdup) was 20 milliliters assaying 100% with a cloud point of 18.9° C. This represents 9% of the starting base. The balance across the fractionation step was 88%.

The final fraction had pycnometer density (20° C.) of 0.7316. The refractive index (25° C.) was 1.3980.

As a control run to indicate the effect of straight fractionation, another quantity of the same crude triethylamine used in the above procedure was fractionated, without water addition, through a column packed with glass helices. A series of four cuts was taken. The highest overhead temperature reached was 78.8° C. at the end of the fourth cut. The cloud points—defined as the temperature at which phase separation occurs— were taken of the four cuts and the residual liquor using a mixture of five milliliters of triethylamine plus three milliliters of distilled water. These results are as follows:

| Sample No. | Cloud Point, °C. | Head temperature | | Pot temperature | | Quantity of Distillate, ml. |
|---|---|---|---|---|---|---|
| | | Start, °C. | End, °C. | Start, °C. | End, °C. | |
| 1 | 22.0 | 71.0 | 75.0 | 77.5 | 77.9 | 100 |
| 2 | 21.1 | 75.0 | 75.2 | 77.9 | 78.5 | 100 |
| 3 | 21.2 | 75.0 | 75.2 | 78.8 | 79.9 | 100 |
| 4 | 22.8 | 75.2 | 78.8 | 80.0 | 84.5 | 100 |
| residue | 52.0 | | | | | (70) |

A sample of new triethylamine by the same method of determination had a cloud point of 17.8° C.

We claim:

A method of recovering triethylamine from a ternary azeotrope of triethylamine, a lower aliphatic alcohol and water, which comprises (1) extractively distilling said azeotropic mixture with a counter-current flow of water in a quantity equal to from about 1 to 10 times the weight of distillate, (2) collecting as a distillate a fraction boiling, at sea level pressure, within the range of 70° C.–80° C., (3) maintaining the distillate at a temperature above about 20° C. so that two phases are obtained, and (4) separating the organic phase comprising predominantly triethylamine.

References Cited in the file of this patent

UNITED STATES PATENTS

| | | |
|---|---|---|
| 2,237,628 | Olin et al. | Apr. 8, 1941 |
| 2,249,816 | Deger | July 22, 1941 |
| 2,348,683 | McKenna | May 9, 1944 |
| 2,413,245 | Reed et al. | Dec. 24, 1946 |
| 2,512,584 | Smith | June 20, 1950 |
| 2,512,585 | Smith | June 20, 1950 |
| 2,527,017 | Luten et al. | Oct. 24, 1950 |

OTHER REFERENCES

Garner: "Industrial Chemist," April 1949 (pp. 238–239).

Weissberger: "Distillation," 1951, Div. 25 (pp. 321 and 338, Library.